United States Patent [19]

Bhatti

[11] Patent Number: 4,515,611
[45] Date of Patent: * May 7, 1985

[54] METHOD OF MAKING GLASS FIBERS

[75] Inventor: Mohinder S. Bhatti, Newark, Ohio

[73] Assignee: Owens-Corning Fiberglas Corporation, Toledo, Ohio

[*] Notice: The portion of the term of this patent subsequent to Apr. 10, 2001 has been disclaimed.

[21] Appl. No.: 562,948

[22] Filed: Nov. 19, 1983

Related U.S. Application Data

[63] Continuation of Ser. No. 486,777, Apr. 20, 1983, Pat. No. 4,441,904.

[51] Int. Cl.³ .................... C03B 37/08; C03B 37/095
[52] U.S. Cl. ................................. 65/2; 65/1;
    65/374.12; 156/272.2; 228/242; 228/243;
    228/263.19; 425/405 H
[58] Field of Search ............ 65/1, 2, 374.12;
    156/272.2; 228/242, 243, 263.19; 425/405 H

[56] References Cited

U.S. PATENT DOCUMENTS

| 4,046,499 | 9/1977 | Saito ............................. 425/405 H |
| 4,068,704 | 1/1978 | Wittmoser .................. 425/405 H X |
| 4,097,977 | 7/1978 | Pollner ........................ 425/405 H X |
| 4,342,577 | 8/1982 | Bhatti et al. ............................ 65/1 |
| 4,342,578 | 8/1982 | Bhatti et al. ............................ 65/1 |
| 4,343,636 | 8/1982 | Bhatti ..................................... 65/1 |
| 4,351,858 | 9/1982 | Hunold et al. ....................... 427/193 |

OTHER PUBLICATIONS

Hot Isostatic Processing MCIC-17-34 Battelle Labs., Columbus, OH Nov. 1977, pp. 1–99.

Primary Examiner—Robert Lindsay
Attorney, Agent, or Firm—Ronald C. Hudgens; Robert F. Rywalski; Greg Dziegielewski

[57] ABSTRACT

A method of making feeder for supplying a plurality of streams of molten inorganic material to be attenuated into filaments is disclosed comprising inserting elements in apertures in a member; sealing said elements and member within a coating adapted to isostatically transmit pressure to said assembly; applying isostatic pressure to the hermetically sealed elements and member to mechanically join the elements to the member; joining the pressed member to other sections to form the feeder; installing the feeder at a fiber forming position to receive molten glass; and then energizing the feeder to fuse the elements to the member to prevent the unwanted passage of molten glass between said elements and said member, said elements having an orifice to permit the passage of molten glass therethrough to establish said streams.

4 Claims, 3 Drawing Figures

METHOD OF MAKING GLASS FIBERS

This is a continuation of application Ser. No. 486,777, filed 4/20/83 now U.S. Pat. No. 4,441,904 granted 4/10/1984.

TECHNICAL FIELD

The invention disclosed herein relates to the production of glass fibers and glass fiber forming feeders.

BACKGROUND ART

With the production of glass fiber forming feeders having an ever-increasing number of orifices or tips to supply the streams of molten material to be attenuated into filaments, the need for effective and efficient systems for attaching the orificed tips or elements in the apertures in the discharge wall has also increased. Previously, the individual projections or tips were welded to the discharge wall by conventional welding techniques, such as cold resistance welding, electron beam welding, laser welding and the like. In essence, each of these systems welded a single tip at a time. With fiber forming feeders having as many as 4,000 or more tips, the welding process can be quite time consuming. Further, there are other problems associated with the systems which are well known in the art.

DISCLOSURE OF THE INVENTION

This invention pertains to a method of making an orificed discharge wall for supplying a plurality of streams of molten inorganic material to be attenuated into filaments comprising: inserting elements in apertures in a member; hermetically sealing said elements and member within a coating adapted to isostatically transmit pressure to said member and elements; applying isostatic pressure to the hermetically sealed elements and member to mechanically join or attach the elements to the member; joining the member having said elements attached thereto to other sections to form a feeder; installing the feeder at a fiber forming position to receive molten glass and then energizing the feeder to fuse the elements to the member to prevent the unwanted passage of molten glass between said elements and said member, said elements having an orifice to permit the passage of molten glass therethrough to establish said streams.

BEST MODE OF CARRYING OUT THE INVENTION

Figure 1:
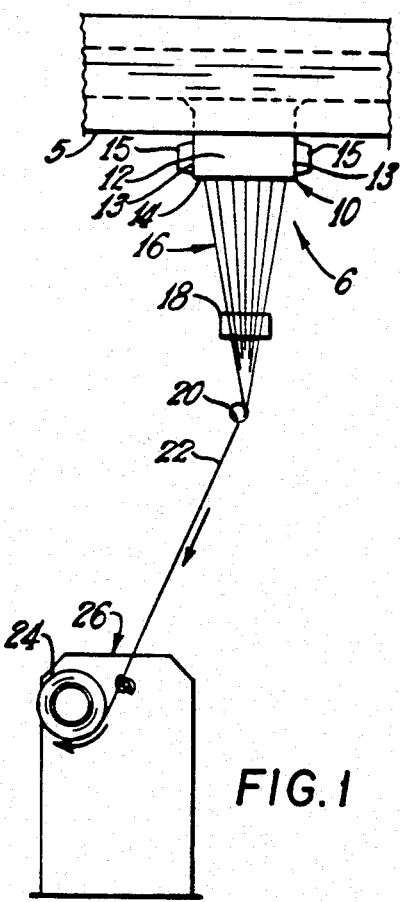
FIG. 1 is a semi-schematic front elevational view of a glass textile type fiber forming system.

As shown in FIG. 1, feeder 10, which is comprised of an orificed bottom or discharge wall 14 and other sections such as containment or sidewalls 12 and end walls 13, is adapted to provide a plurality of streams of molten inorganic material, such as glass, through a plurality of orificed elements 85. Feeder 20, including discharge wall 14, is electrically energized via terminals 15 joined to a suitable source of electrical energy (not shown) to heat the glass therein as is known in the art. As shown, terminals 15 are joined to end walls 13, but terminals 15 may extend outwardly from bottom wall 14 if desired. The streams of molten glass can be attenuated into filaments 16 through the action of winder 26 or any other suitable means.

As is known in the art, size applicator means 18 provides a coating or sizing material to the surface of the glass filaments which advance to gathering shoe or means 20 to be collected as an advancing strand or bundle 22. Strand 22 is then wound into package 24 upon a collet of winder 26 as is known in the art. Thus, FIG. 1 schematically represents a "textile" fiber forming system.

Figure 2:
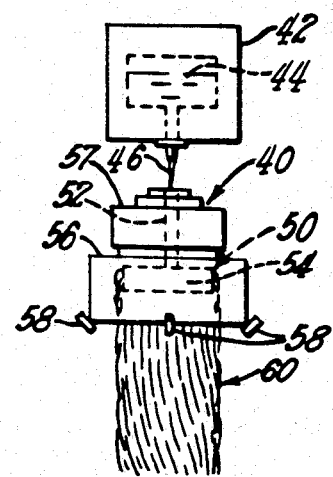
FIG. 2 is a semi-schematic front elevational view of a glass wool or rotary fiber forming system.

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds, is comprised of a quill 52 and a circumferential fiberizing or discharge wall 54 having a plurality of orificed elements 85 adapted to supply a plurality of streams of molten inorganic material to be fiberized. Such elements may be flush with the exterior surface of the wall or project outwardly therefrom.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58 as is known in the art.

As is shown in the drawings, member 69 of the fiberization or discharge walls 14 or 54 of the feeders 10 and 50, respectively, may be based upon a laminate comprised of a refractory metal core 70 having an oxygen impervious, precious metal sheath intimately bonded thereto by hot isostatic pressing (i.e., HIP) as is disclosed in my patent application Ser. No. 200,677, filed on Oct. 27, 1980, which is hereby incorporated by reference. Or, member 69 may be comprised entirely of any suitable material, such as a platinum and rhodium alloy which, for example, is well known in the art.

Regarding the laminated member, such refractory metals are selected from the group of materials consisting of molybdenum (Mo), columbium (Cb), tungsten (W), rhenium (Re), tantalum (Ta), hafnium (Hf), titanium (Ti), chromium (Cr), zirconium (Zr), vanadium (V), and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particularly, the precious metals for first layer 78, second layer 79 and/or elements 85 are selected from a group consisting of platinum (Pt), palladium (Pd), iridium (Ir), osmium (Os), rhodium (Rh), ruthenium (Ru), and alloys based on such metals. Included in the platinum alloys are H alloy and J alloy which are alloys of platinum and rhodium of 90%/10% and 75%/25% composition, respectively. In essence, the laminate is comprised of a plurality of layers of material wherein one of said layers is a refractory metal, and another of said layers is an oxygen impervious, precious metal, said plurality of layers being intimately bonded together by the application of isostatic pressure and heat to form a unitary laminate. Or, the laminate may contain an intermediate diffusion barrier between the refractory metal layer and the precious metal layer as set forth in my co-pending U.S. patent application Ser. No. 452,274, filed on Dec. 22, 1982.

Figure 3:
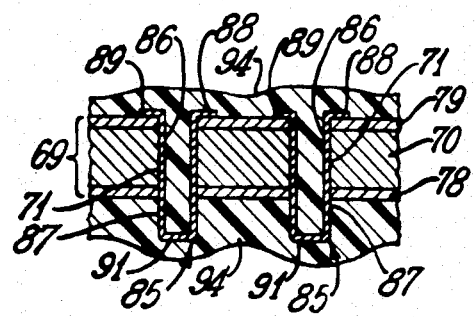
FIG. 3 is an enlarged cross-sectional view of the discharge wall of the feeder shown in FIG. 1.

FIG. 3 depicts a portion of a discharge wall at a point during fabrication according to the principles of this invention. As such, elements or tips 85 are positioned in apertures 71 located in member 69. Then an elastic coating 94 is applied to the assembled member 69 and elements 85 to hermetically seal the elements and member therewithin. The coating or material 94 must be capable of isostatically transmitting fluidic pressure to member 69 and elements 85, and the coating material must prevent the migration of the working fluid such as "oil" in a cold isostatic pressing unit, between the mating surfaces of member 69 and elements 85. As will be explained later herein, cold isostatic pressing (CIP) is preferred and such coating materials are preferably elastomers such as PVC.

Then, isostatic pressure is applied to the coated assembly sufficient to mechanically seal or join the elements 85 to member 69. As described in my U.S. patent application Ser. No. 398,536 filed on July 15, 1982, which is hereby incorporated by reference, the pressed member and elements were heated in a furnace to fuse the member and elements together prior to joining the other sections to the member 69 to form feeder 10. With that application of heat, the mechanically sealed elements and member are fused together to prevent the unwanted passage of molten glass between the elements 85 and member 69 of discharge walls 14 and 54. Then the discharge wall was joined to the sidewalls and end walls to form the feeder.

According to the principles of this invention, the intermediate heating step to fuse elements and member together is dispensed with. That is, member 69 having elements 85 CIP'ed thereto is joined to the remaining sections, such as sidewalls 12 and end walls 13 to form feeder 10 in the absence of previously heating member 69 and elements 85 to fuse them together. Subsequently, feeder 10 is placed in "position", that is, in place to receive molten glass for attenuation into filaments (e.g., under a forehearth), and electrically energized to resistively heat feeder 10, including member 69 to fuse elements 85 thereto, in situ, at the start up of the feeder 10.

A glass fiber forming feeder 10 discharge wall 14 was fabricated from a platinum-rhodium alloy plate or member 69 and a plurality of platinum-rhodium alloy elements or tips 85. As such, member 69 contained 800 apertures which each received an element 85. Each of the elements or tips 85 were comprised of a sleeve 87 and a flange 89. An orifice 86 within sleeve 87 extended from first end 88 at flange 89 to a second end 91 along sleeve 87. As shown in FIG. 3, second end 91 was closed. However, it is to be understood that tips 85 may be supplied with an open second end 91 such that orifice 86 extends completely through element 85.

The elements 85 were inserted into aperture 71 of member 69 such that flange 89 was in abutting engagement with one side of member 69 and such that a portion of sleeve 87, including second end 91, extended beyond the opposite side of member 69.

The loose assembly of elements 85 and member 69 was then dipped in a liquid bath of polyvinylchloride (PVC) to coat the exposed surfaces of elements 85 and member 69 and to fill orifices 86 of element 85. After the application of the liquid coating, a slight vacuum was applied to assist in the complete filling of the orifices 86 with the elastomeric material. The PVC or pressure transmitting media was then cured or solidified to a pliable state to seal elements 85 and member 69 against the migration of the working fluid in the pressing unit therebetween.

The coated assembly was then placed in the oil bath of a cold isostatic pressing (CIP) unit, and a pressure of about 150,000 psi was exerted on the coated assembly to mechanically seal or join the elements to the member. Care should be taken to insure that all the orifices 86 are filled with media 94, because if the orifices 86 are not completely filled with the pressure transmitting media 94, the sleeves 87 may collapse upon the application of the pressure. Since cold isostatic pressure or pressing was employed, the operation was carried forth at approximately room temperature.

Subsequent to the application of isostatic pressure in the CIP unit, the elastomeric coating 94 was slit and removed from mechanically joined member 69 and elements 85. The second ends 91 of elements 85 were then machined to open orifice 86.

Then the sub-assembly, comprised of the mechanically sealed elements and member 69, was suitably joined to sidewalls 12 and end walls 13 to form feeder 10. Subsequently, feeder 10 was positioned beneath a supply of molten glass, such as a forehearth or foremelter, as is known in the art. That is, feeder 10 is installed in the refractory 5 of a fiber forming position 6 so that molten glass is supplied to feeder 10 for attenuation into filament 16. Terminals 15 are joined as suitable source of electrical energy and then power is supplied to gradually raise the temperature of feeder 10 to the desired level as is done with conventionally fabricated feeders.

Preferably, the material of tips or element 85 has a coefficient of expansion greater than that of member 69. As such, upon heating or energization of feeder 10, sleeves 87 of elements 85 tend to expand more than the internal diameter of the apertures 71 of member 69 such that sleeve 87 is even more intimately pressed into the portion of member 69 to finding aperture 71.

In the foregoing example, the elements 85 were comprised of H alloy while the member 69 was comprised of J alloy. Upon electrically energizing feeder 10, and thus member 69, the members 85 are fused to member 69 at flange 89 and sleeve 87.

If member 69 is comprised of a laminate having a refractory metal core as disclosed herein, feeder 10 is preferably surrounded in an inert gas, such as nitrogen, to prevent the oxygen containing atmosphere from oxidizing the refractory metal core prior to the fusion of the precious metal element 85 to the precious metal layers 78 and 79.

The coating material should not be too fluid or pliable. That is, the coating 94 should be sufficiently viscous to prevent the flow of the coating between the elements 85 and member 69 which may prevent the effective mechanical attachment of elements 85 to member 69.

Although in the foregoing example, the member 69 was completely encased within the pressure transmitting coating 94, it is only necessary that the elements 85 and that portion of member 69 associated therewith be heremetically sealed by the coating. That is, other portions of member 69 may be left uncoated.

According to the foregoing procedures, if a tip 85, as shown in FIG. 3, is employed, the flange 89 will be fused to one surface of member 69 and sleeve 87 will be fused to the portion of member 69 defining the apertures 71 associated therewith. Further, if the refractory metal/precious metal laminate is employed as member 69, the sleeve 87 of element 85 will fuse to core 70 and layers 78 and 79 to seal the refractory metal within a protective layer of oxygen impervious, precious metal to prevent the oxidation of the refractory metal at elevated temperatures.

Also, it is to be understood that element 85 may be of any suitable shape, and, in particular, flange 89 may be dispensed with and/or the length of sleeve 87 may also be substantially equal to the thickness of member 69 to provide a tipless orifice plate having orifices lined with a suitable material fused to the member 69.

To provide an effective mechanical seal between the elements and member in the isostatic pressing step, it is preferred that the isostatic pressure applied be greater than or equal to the yield point of the material of the elements 85 at the temperature employed for the pressing step.

With respect to the in-situ fusing of elements 85 to discharge wall 54 for a rotor 50, the "energization" to fuse can occur when the high temperature gaseous blast from burner/blower 57 heats wall 54 and elements 85 at initial start up.

From the foregoing, it can be seen that the present invention is applicable to the joining of the precious metal elements to the laminated walls or members as disclosed in, for example, U.S. Pat. No. 4,342,577, issued Aug. 3, 1982, in the names of Mohinder S. Bhatti and Alfred Marzocchi; and/or U.S. Pat. No. 4,343,636, issued Aug. 10, 1982, issued in my name, which are hereby incorporated by reference.

It is apparent that within the scope of the present invention, modifications and different arrangements can be made other than as herein disclosed. The present disclosure is merely illustrative with the invention comprehending all variations thereof.

INDUSTRIAL APPLICABILITY

The invention disclosed herein is readily applicable to the formation of continuous and/or staple glass filaments.

I claim:

1. In a method of making glass filaments wherein a plurality of streams of molten glass issuing from an orificed discharge wall of a feeder are attenuauted into filaments, the improvements comprising said feeder being fabricated by:

positioning elements in apertures in a member;

providing a layer of elastomeric material about said member and elements positioned therein, said layer being capable of transmitting pressure isostatically and being effective to prevent the migration of working fluid of an after-defined pressing unit between the member and elements;

locating said member and elements having said layer thereabout within a pressing unit having a body of working therein;

applying isostatic pressure to the layer containing the elements and member to mechanically seal the elements to the member;

joining the pressed member and elements to sections to form said feeder;

installing said feeder at a fiber forming position to receive molten glass; and then energizing the feeder to fuse the elements to the member to prevent an unwanted passage of molten glass between said elements and said member, said elements having an orifice to permit the passage of molten glass therethrough to establish said streams.

2. A method of making feeder for supplying a plurality of streams of molten inorganic material to be attenuated into filaments comprising:

positioning elements in apertures in a member;

providing a sealed layer of elastomeric material around said member elements positioned therewithin adapted to isostatically transmit pressure to said elements and member;

applying isostatic pressure to the sealed layer containing said elements and member to mechanically seal the elements to the member;

incorporating the pressed member into said feeder in the absence of heating the pressed member and elements to fuse said member and elements prior to such incorporation; and then electrically energizing the feeder to fuse the elements to the member to prevent the unwanted passage of molten glass between said elements and said member, said elements having an orifice to permit the passage of molten glass therethrough to establish said streams.

3. The method of claim 2 wherein the pressure is applied approximately at room temperature and the pressure is greater than or equal to the yield point of the material of the elements at such temperature.

4. The method of claim 1 wherein said elements and member are cold isostatically pressed together.

* * * * *